April 5, 1966 W. ZIEG 3,243,850
APPARATUS FOR THE PRODUCTION OF CORRUGATED TUBES
Filed March 5, 1963 5 Sheets-Sheet 2

INVENTOR
WILHELM ZIEG
BY
ATTORNEY

April 5, 1966   W. ZIEG   3,243,850
APPARATUS FOR THE PRODUCTION OF CORRUGATED TUBES
Filed March 5, 1963   5 Sheets-Sheet 3

INVENTOR
WILHELM ZIEG
BY
Michael S. Striker
ATTORNEY

April 5, 1966  W. ZIEG  3,243,850
APPARATUS FOR THE PRODUCTION OF CORRUGATED TUBES
Filed March 5, 1963  5 Sheets-Sheet 5

INVENTOR
Wilhelm Zieg
BY
Michael S. Striker
ATTORNEY

Patented Apr. 5, 1966

3,243,850
APPARATUS FOR THE PRODUCTION OF CORRUGATED TUBES
Wilhelm Zieg, Bavaria, Germany, assignor to Frankische Isolierrohr- und Metallwarenwerke Gebrueder Kirchner, Bavaria, Germany
Filed Mar. 5, 1963, Ser. No. 263,680
Claims priority, application Germany, Feb. 21, 1959, F 27,771
10 Claims. (Cl. 18—19)

The present application is a continuation-in-part application of copending application, Serial No. 861,806, filed December 24, 1959, and now abandoned.

The present invention relates to flexible corrugated tubes of plastic material, such as may be utilized to form protective insulating sheaths for electric conductors and the like, and to an apparatus for making such tubes. More particularly, the invention relates to an apparatus for the production of circumferentially corrugated flexible tubing of hardenable plastic material.

An important object of the invention is to provide for continuously and rapidly producing circumferentially corrugated tubes in a simple and economical manner.

Another object of the present invention is to provide for the manufacture of corrugated tubing having widely different diameters and wall thicknesses.

A further object of the invention is to provide for the manufacture of corrugated tubing whereby the tube is formed in a continuous uninterrupted operation starting with a deformable plastic mass and ending with a self-supporting flexible corrugated tube which is ready for storage, shipment or actual use.

More specifically, it is an object of the instant invention to provide an apparatus for the manufacture of tubing of the above outlined type, the apparatus being of simple construction, reliable in operation, and requiring comparatively little attention when in actual use.

With the above objects in view, the invention concerns the manufacture of corrugated tubing by extruding a hardenable plastic material to form a continuous smooth-walled tube which is thereupon conveyed into a mold cavity having corrugated mold walls, introducing a fluid pressure medium into the interior of the smooth-walled tube, and permitting the pressure medium to act against the inner side of the tube whereby it deforms the tube into engagement with the corrugated walls of the mold cavity. The wall of the extruded and still deformable tubular product thus assumes the shape of the mold cavity and is transformed into a corrugated tube, preferably while advancing in a direction away from the point of extrusion together with the molding means which latter defines the aforementioned mold cavity. It is also preferred to cool the corrugated product before removal from the mold cavity to insure that the tube may be withdrawn without deformation of its corrugated walls and without adhering to the component parts of the corrugating apparatus. Preferably, the tube, while being extruded, is also stretched in longitudinal and/or radial direction.

The novel apparatus comprises a composite mold which consists of separable mold sections defining therebetween comparatively short portions of the aforementioned mold cavity, and each mold section is further separable into two half matrices with corrugated inner walls, the matching half matrices being of equal length and being mounted for travel in two endless paths in end-to-end relation. These endless paths merge or communicate with each other to form a straight corrugating zone whose width equals the combined width of said paths and in which the respective half matrices form tubular, internally corrugated mold sections. By mounting the half matrices for travel in two endless paths, the apparatus is capable of continuous operation and, in addition, such arrangement simplifies the construction of the drive means which maintains the half matrices and the mold sections formed thereby in motion during the corrugating operation.

The above described apparatus cooperates with an extrusion press whose nozzle extrudes a continuous, deformable, smooth-walled plastic tube directly into closed mold section located on the corrugating zone, as well as with a device (e.g., an air compressor) for delivering a compressed fluid medium into the extruded tube while the latter advances through the corrugating zone to transform the tube into a corrugated product by pressing its deformable wall against the corrugated walls of the matching half matrices. A coolant may be circulated in channels formed by the walls of the means defining the aforementioned endless paths for the component parts of the mold section, the position of the cooling channels being preferably such that the deformed tube sets as it reaches the end of the corrugating zone and is then ready for storage, shipment or actual use as soon as it is removed from the corrugating apparatus.

The novel features which are considered as characteristic for the invention are set forth in particular in the appended claims. The invention itself, however, both as to its construction and its method of operation, together with additional objects and advantages thereof, will be best understood from the following detailed description of a specific embodiment when read in connection with the accompanying drawings, in which:

Figure 1A:
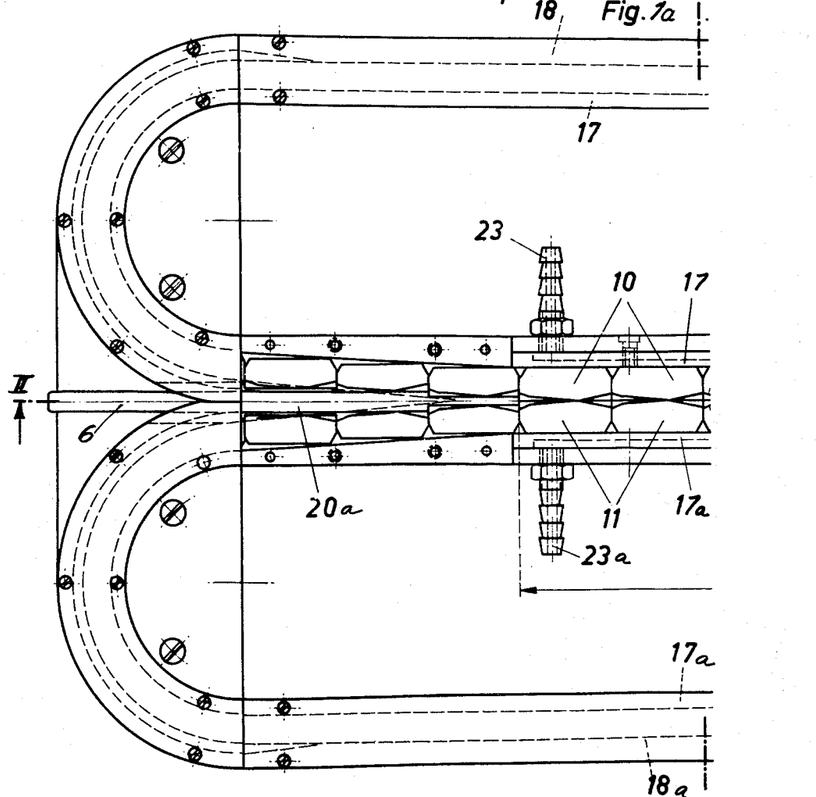
FIG. 1 is composed of FIGS. 1a and 1b and is a schematic top plan view of the corrugating apparatus with certain elements partly broken away.
Figure 1B:
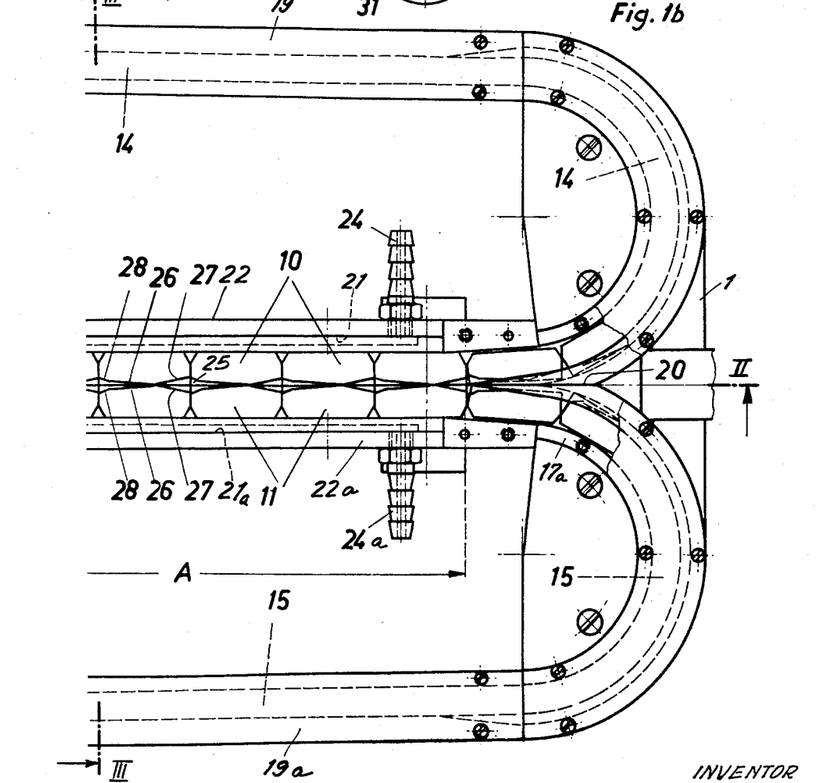

Referring now in greater detail to the illustrated embodiment, and first to FIG. 1, there is shown a corrugating apparatus which comprises a base plate 1 supporting the means defining a pair of endless, substantially oval paths 14, 15 for a pair of molding means in the form of two sets of half matrices 10, 11, respectively. Each path is shaped as a closed channel and consists of two elongated parallel straight zones and a pair of arcuate end zones, one elongated straight zone of the path 14 being adjacent to and merging with one elongated straight zone of the other path 15 to form a straight corrugating zone A.

Figure 2A:
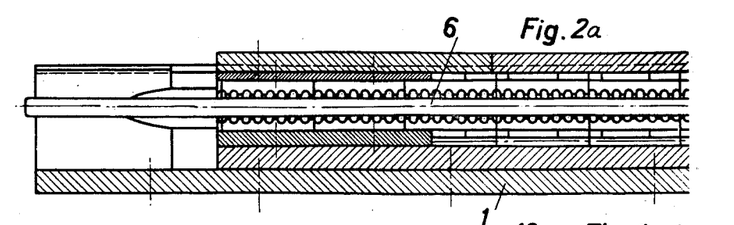
FIG. 2 which is composed of FIGS. 2a and 2b, is a vertical section taken along the line II—II of FIG. 1, as seen in the direction of the arrows.

As is shown in FIGS. 1 and 2, the corrugating apparatus is combined and cooperates with an extrusion press whose nozzle 2 is aligned with and is located at the entry end of the straight corrugating zone A, and coaxially receives a hollow mandrel 3. The members 2, 3 define therebetween an annular extrusion passage 4 for the passage of a soft, hardenable plastic substance which is transformed in said passage into a smooth-walled elongated tubular body as it travels between the mandrel 3 and the surrounding portion of the extrusion nozzle. The plastic material is continuously delivered by a non-represented extruder whose construction forms no part of my present invention.

The mandrel 3 is formed with a coaxial bore 5 for the passage of a fluid pressure medium e.g., compressed air or another gas. The pressure medium may be delivered by a compressor or the like of any known design. The left-hand end of the mandrel is internally threaded and meshes with the externally threaded right-hand end of a coaxial connecting rod or mandrel 6. The connecting rod 6 has a central blind bore 7 which communicates with the bore 5, as well as a series of preferably uniformly spaced radial discharge ports or bores 8, e.g., four in number, for permitting the entry of fluid pressure medium from the bore 7 into the interior of the smooth-walled deformable plastic tube which latter is extruded through the passage 4 and advances into and through the inlet end of the corrugating zone A. Thus, the bores 5, 7 and 8 constitute passage means for the introduction of a compressed fluid into the extruded and still deformable tubular product. The fluid deforms the tube to the extent permitted by the corrugated walls of the mold cavities in mold sections formed by matching half matrices 10, 11 advancing through the corrugating zone A. The nozzle 2 may be heated for instance by electrical heating means embedded in the nozzle or heated pressure fluid may be introduced through the passage means to assure the necessary plasticity of the extruded tube.

The connecting rod or mandrel 6 extends through and beyond the corrugating or deforming zone A and comprises, at a point distant from the extrusion nozzle 2, an enlarged portion or boss 9 whose diameter corresponds to the inner diameter of the corrugated tube formed in the zone A; thus, the boss hinders the escape of pressure fluid from the interior of the corrugated tubular product, e.g., an electric insulating tube or the like.

Figure 2B:
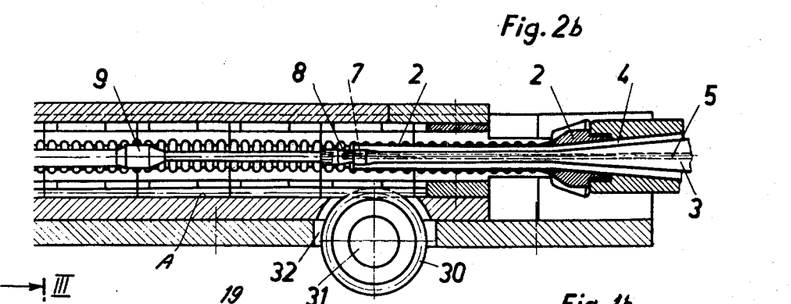
Figure 7:
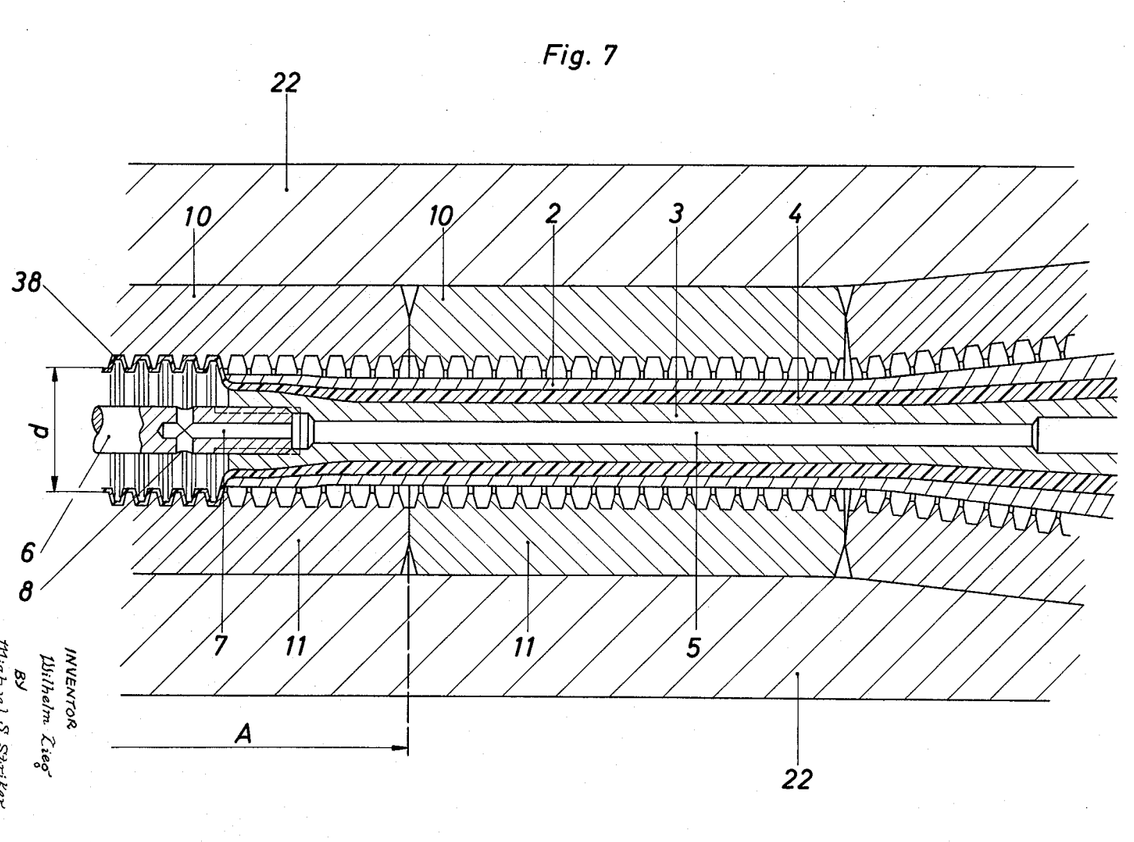
FIG. 7 is a horizontal section through part of the apparatus illustrated at the right side of FIG. 2b, and showing at an enlarged scale an arrangement slightly modified from the arrangement shown in FIG. 2b.
Figure 8:
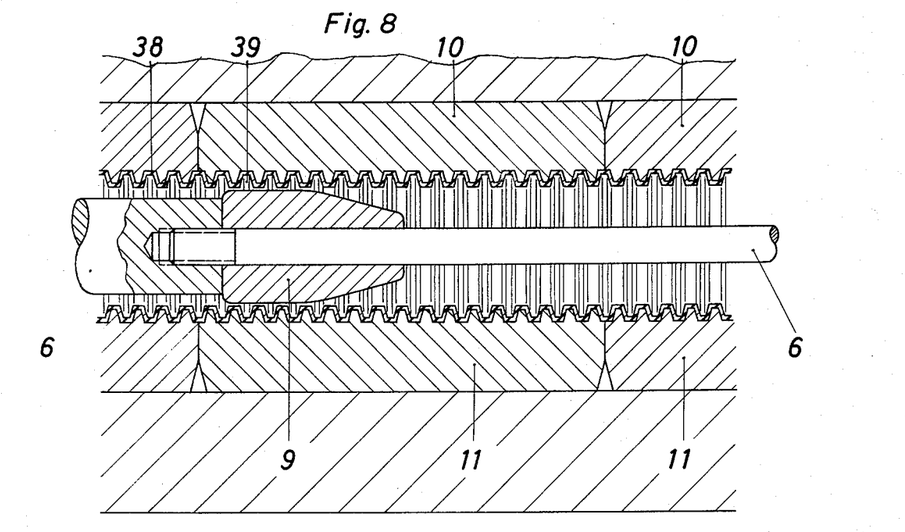
FIG. 8 is a horizontal section through part of the apparatus and showing at an enlarged scale an arrangement slightly modified from that shown at the left side of FIG. 2b.

FIGS. 7 and 8 show at an enlarged scale slightly modified forms of the arrangement shown in FIG. 2b. The arrangement shown in FIG. 7, differs from that shown in FIG. 2b, in that the annular extrusion passage 4 has at the free end of the extrusion nozzle 2, shown in FIG. 7 as the left end of the extrusion nozzle, an outer diameter which is smaller than the minimum inner diameter $d$ of the continuous elongated mold cavity formed by the complementary mold cavities of the half matrices 10, and 11 located in the corrugating zone A. It should be further noted that in the arrangements shown in FIG. 2b as well as in FIG. 7 the free or left end of the extrusion nozzle 2, extends into the right end, as viewed in FIGS. 2b and 7 of the elongated continuous mold cavity forming the corrugating zone, or, in other words, the nozzle 2 extends into complementary half-matrices 10 and 11 which are fully abutting against each other along the abutment surfaces 25 thereof.

The arrangement shown in FIGS. 7 and 8 differs also slightly from the arrangement shown in FIG. 2b, in that instead of forming an enlarged portion 9 integral with the connecting rod or mandrel 6, a separate substantially cylindrical member 9' is provided on the left end, as viewed in FIG. 8 on a connecting rod 6' which is screwed at the right end thereof, as viewed in FIG. 7, into an internally threaded bore of the mandrel 3, and a rod 6" of a larger diameter than the rod 6' is screwed onto the left end, as viewed in FIG. 8, of the connecting rod 6', holding thereby the cylindrical member 9' in a fixed position from the free end of the extrusion nozzle 2. The maximum diameter of the cylindrical member 9' is one to three thousandths of an inch smaller than the minimum diameter of the corrugated tube 38 produced in the apparatus of the present invention so that there is a very small clearance between the cylindrical member 9' and the corrugated tube produced. Despite this small clearance, escape of pressure fluid which is fed through into the interior of the extruded tube through the passage 5 in the mandrel 6, the passage 7 in the right end, as viewed in FIG. 7, of the connecting rod 6' and the cross bores 8 communicating with the passage 7, is positively prevented since the pressure fluid will, in passing between the cylindrical member 9' and the inner surface of the corrugated tube 38 be successively compressed while passing through the small clearance gaps formed between the outer diameter of the cylindrical member 9 and the smaller inner diameter of the corrugated tube 38, and expanded in the successive ring chambers 39 formed by the corrugation of the tube. This successive compression and expansion of the pressure fluid will create such a turbulent flow so that any substantial escape of pressure fluid through the small gap between the cylindrical element 9' and the corrugated tube 38 is substantially prevented.

Figure 4:
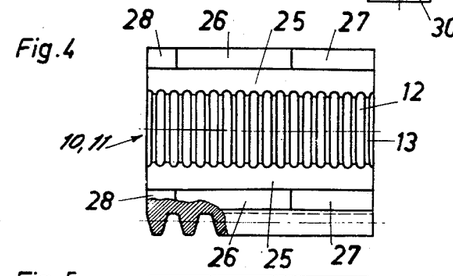
FIG. 4 is an enlarged front elevational and partly sectional view showing the mold cavity of a half matrix.
Figure 5:
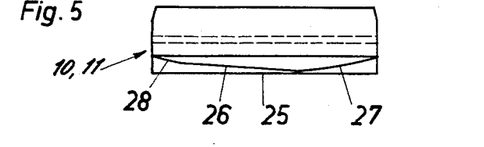
FIG. 5 is a top plan view of the half matrix.
Figure 6:
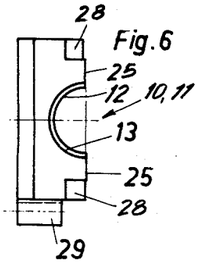
FIG. 6 is an end elevational view of the half matrix.

The half matrices 10, 11 are of identical configuration, and one thereof is shown in three different views in FIGS. 4 to 6. It comprises an elongated mold cavity having circumferentially corrugated walls whose corrugations are formed by alternately arranged parallel ribs 12 and grooves 14 (FIG. 4), the ribs 12 forming grooves and the grooves 13 causing the formation of ribs in the deformable tubular product extruded through the annular passage 4. Each pair of half matrices 10, 11 forms a tubular mold section in the corrugating zone A (FIG. 1), and the adjacent mold sections constitute an uninterrupted endless composite mold which may advance at the same speed at which the smooth-walled and still deformable plastic tube is extruded through the annular passage or orifice 4.

Figure 3:
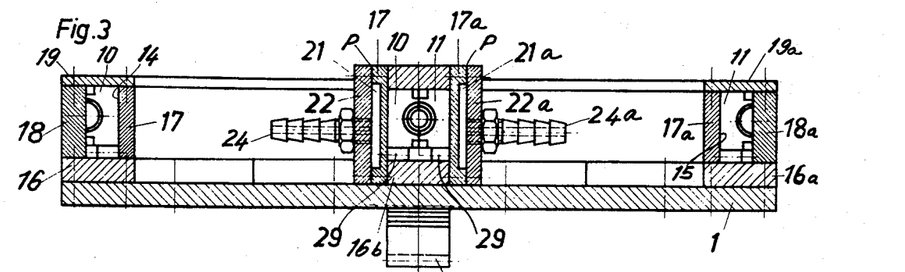
FIG. 3 is a transverse section taken on the line III—III of FIG. 1, as seen in the direction of the arrows.

As shown in FIGS. 2 and 3, the path 14 for the half matrices 10 is formed by an endless tubular assembly comprising a bottom plate 16, a pair of spaced upstanding walls 17, 18, and a cover plate or lid 19. The inner wall 17 is continuous and forms an endless inner guide for the end-to-end disposed half matrices 10 which travel through the endless path 14 in clockwise direction, i.e., they reach the inlet end of the corrugating zone A at a point adjacent to the extrusion nozzle 2 and thereupon advance to the left toward and beyond the discharge end of the corrugating zone to reenter said zone after having passed through the entire endless path 14.

The other endless path 15 for the half matrices 11 is formed by a bottom plate 16a, two spaced upstanding walls 17a, 18a, and a cover plate or lid 19a. As can be observed in FIG. 3, the bottom plates 16, 16a may consist of a single piece of material which comprises a common web 16b extending below the corrugating zone A.

The upstanding outer walls 18, 18a are broken away in and beyond the zone A so that the half matrices 10, 11 may form tubular mold sections at a point immediately adjacent to the discharge end of the extrusion nozzle 2. Proper guidance of half matrices 10, 11 into the corrugating zone is brought about by wedge-shaped inserts 20 which insure smooth transition of members 10, 11 from the arcuate zones of paths 14, 15, respectively, into the straight corrugating or tube deforming zone A. The length of paths 14, 15 is the same, as well as the number of end-to-end arranged half matrices 10, 11 therein.

The portions of walls 17, 17a extending along the corrugating zone A are formed with cutouts or recesses 21, 21a (FIG. 3) covered by sheet metal or like plates 22, 22a to form two closed channels for a coolant, e.g., water. A layer of packing material P is inserted between the adjacent faces of parts 17, 22 and 17a, 22a to form an airtight seal which prevents escape of coolant from the recesses 21, 21a, respectively. The recess 21 receives coolant from a non-represented hose connected to an inlet nipple 23, and discharges spent coolant through a discharge nipple 24. The other recess 21a communicates with an inlet nipple 23a and a discharge nipple 24a. As may be observed in FIG. 1, the cooling medium flows in a direction counter to that in which the half matries 10, 11 advance in the corrugating zone A. It is understood that the arrangement illustrated in FIGS. 7 and 8 may also be provided with cooling means as described above, which for clarity sake are not shown in FIGS. 7 and 8.

FIGS. 1 and 3 illustrate that the width of the corrugating zone A equals the combined width of straight zones of the paths 14 and 15 so that the matching half matrices may travel face-to-face in a direction to left and away from the extrusion nozzle 2, their mold cavities receiving first the mandrel 3 and thereupon the guide member 6. While passing through the zone A, the half matrices 10, 11 form two-piece tubular mold sections by abutting against each other along their contact surfaces 25 above and below the mold cavities (FIGS. 4 and 6) so as to define a single circular mold cavity bounded by the corrugated walls formed by the aforementioned ribs 12 and grooves 13. The mold cavity of each member 10 or 11 is bounded by two contact surfaces 25 which extend in the longitudinal direction thereof. The upper and lower part of each half matrix above and below the contact surfaces 25 is formed with inclined surfaces or facets 26, 27, 28 which form wedge-shaped spaces or recesses when a pair of matching members 10, 11 advances through the corrugating zone A. The wedges 20 (FIG. 1) are located at the level of facets 26–28 and, by sliding along the members 20, these facets guide the half matrices from the arcuate zones of paths 14, 15 into the straight corrugating zone A. Similar wedge-shaped inserts 20a are provided at the left-hand end of the zone A to insure smooth transition of half matrices back into the left-hand arcuate zones of endless paths 14 and 15. It will be noted in FIG. 1 that the arcuate zones of paths 14, 15 are somewhat wider than the straight zones to prevent a pile-up of half matrices therein, i.e., the width of such arcuate zones exceeds the width of individual half matrices.

Each half matrix is formed at its underside with a toothed rack segment 29 which extends the full length thereof (FIG. 4) and slides along the bottom plate 16, 16a or 16b while the half matrix advances in its path 14 or 15. The rack segments 29 of half matrices 10 and 11 form two composite toothed racks each of which is straight in the corrugating zone A as long as the contact faces 25 of the half matrices remain in abutment with each other. The toothed rack segments 29 act as a means for advancing the half matrices 10, 11 in their respective paths 14, 15 by successively engaging with a driven gear 30 which is located at a point below the discharge end of the extrusion nozzle 2, i.e., at the entry end of the corrugating zone A, and whose axially parallel teeth mesh with the teeth of the rack segments 29 thereabove to advance the half matrices in a direction to the left, that is, away from the extrusion nozzle. The gear 30 is fixed to a horizontal shaft 31 which is driven by an electric or like motor, not shown. The plates 1 and 16b are formed with a transverse cutout 32 through which the gear 30 extends into mesh with the toothed rack segments 29 of the matching half matrices 10, 11 thereabove. The width of the gear 30 is so selected that its teeth simultaneously mesh with the rack segments 29 of aligned half matrices 10, 11, i.e., the gear can mesh simultaneously with two parallel toothed rack segments 29. It will be readily understood that the shafts 31 may carry two gears each of which will then mesh with a single rack segment 29.

Figure 9:
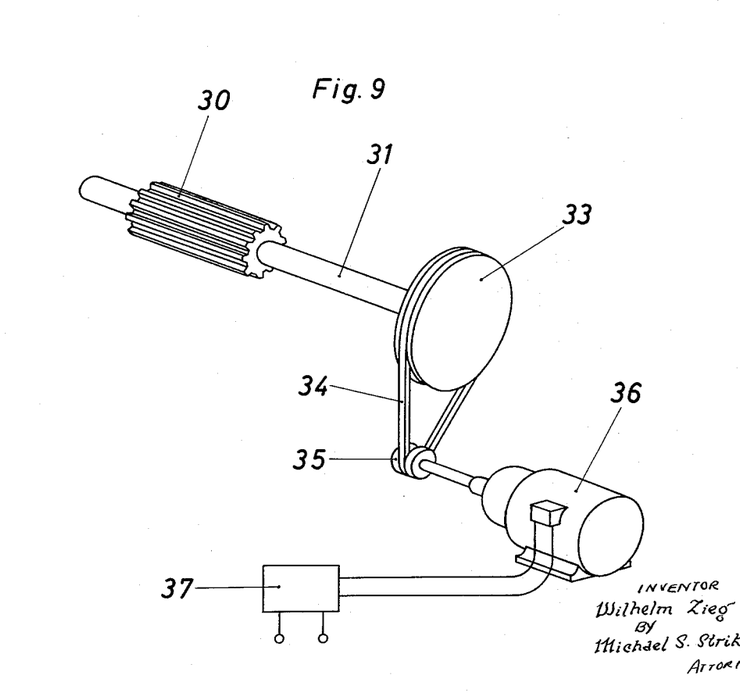
FIG. 9 is a schematic perspective view of a drive arrangement for advancing the half matrices through the two endless paths.

A preferred drive arrangement is schematically shown in FIG. 9. In this arrangement, the gear 30 which is adapted to mesh with the rack segments 29 on the half matrices 10 and 11, not shown in FIG. 9, is fixedly mounted on a shaft 31 which carries on one end thereof a pulley 33 fixedly connected thereto. The pulley 33 is driven over a V-belt 34 from a small pulley 35 fixed to the shaft of an electromotor 36. A speed regulator 37 is electrically connected to the motor 36 to vary the speed thereof, and to vary thereby the rotational speed of the gear 30 so that depending on the adjusted speed of the motor 36 the matrices or mold element 10 and 11 may be pushed with greater or smaller speed through the corrugating zone and along their respective endless paths.

The corrugating assembly operates as follows:

The non-represented extruder delivers hardenable plastic material into the discharge nozzle 2 which latter, together with the mandrel 3, transforms the material into a soft, deformable, smooth-walled tubular body passing through the annular extrusion orifice 4 to be directly extruded into the corrugating zone A in which the half matrices 10 and 11 abut against each other to form an elongated mold cavity, to advance about the mandrel 3 and thereupon about the connecting rod 6. The gear 30 is continuously driven by its shaft 31 and advances the matching half matrices 10, 11 through the corrugating zone in a direction away from the extrusion nozzle 2. The arrangement is such that, as soon as one pair of members 10, 11 is moved beyond the gear 30, the latter already meshes with the rack segments 20 of the next pair of half matrices 10, 11, and so forth, i.e., the matching pairs of half matrices 10, 11 are advanced in a continuous, uninterrupted train through and beyond the corrugating zone A. The rotational speed of the gear 30 may be selected in such a way that the half matrices 10, 11 advance at the speed at which the smooth-walled tubular body is extruded into the corrugating zone.

The smooth-walled tube enters the zone A in a still deformable state and is immediately subjected to the deforming action of a compressed fluid while advancing between the nozzle 2 and the boss 9 of the connecting rod 6. The compressed fluid enters the interior of the extruded tubular product through the channel defined by the bores 5, 7 and 8, and expands the tube by pressing its wall against the corrugated inner walls of the mold cavities formed by matching half matrices 10, 11. Thus, the tube assumes the shape of the corrugated walls in the tubular mold cavities of advancing mold sections formed by the half matrices 10, 11, and is transformed into a circumferentially or helically corrugated body which then advances about the guide member 6, beyond the latter's boss 9, and is evacuated through the discharge end of the corrugating zone at the left-hand end of the apparatus (FIGS. 1 and 2).

When a drive arrangement as shown in FIG. 9 is used, it is possible to adjust the rotational speed of the gear 30 in such a way that the half matrices 10 and 11 will be advanced at a speed greater than that at which the smooth or tubular body is extruded into the corrugating zone.

Since the expanded and already corrugated tube 38 will be advanced at the same speed as the half matrices 10 and 11, it is evident that by advancing the half matrices 10 and 11 at a greater speed than that at which the tube is extruded into the mold cavity, the tube portion leaving the free end of the extrusion nozzle will be stretched in longitudinal direction during the extrusion process. In addition, if the extrusion passage 4 has at the free end of the extrusion nozzle a smaller diameter than the minimum diameter of the mold cavity formed by the corrugated walls of the half matrices 10 and 11, as shown in FIG. 7, a considerable stretch in radial direction will also be imparted on the tube material as it is being extruded into the elongated continuous mold cavity. This simultaneous stretching of the extruded tubular body in longitudinal and radial direction will arrange the macro-molecules of the plastic material in such directions which will correspond to the actual stresses the finished tube will be subjected during use. The strength of the finished tube is thereby increased in an advantageous manner over the strength of tubes in which such a stretching of the material as it is being extruded is not carried out.

While FIG. 9 shows an electrical device for regulating the speed of the motor 36, it is understood that the rotational speed of the gear 30 and therewith the linear speed of the half matrices 10 and 11 could be regulated also in various different ways which will be obvious to any expert working in the field. For instance, the motor 36 could be formed as a gear motor with an adjustable gear drive or a stepless adjustable V-belt pulley arrangement well known in the art may be used instead of the belt and pulley arrangement shown in FIG. 9.

While passing through the corrugating zone A, the tubular product is cooled by the liquid medium circulating in the recesses or channels 21, 21a, and sets or hardens sufficiently to be removable from the machine as a self-supporting flexible body. The matching half matrices open or separate while passing along the wedge 20a and permit unobstructed advance of the circumferentially or helically corrugated tubular product toward and beyond the left-hand end of the guide member 6.

Without further analysis, the foregoing will so fully reveal the gist of the present invention that others can, by applying current knowledge, readily adapt it for various application without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. In an apparatus for continuously molding of corrugated tubes from hardenable plastic material, in combination, two series of half matrices arranged end-to-end in each series, each half matrix having a mold cavity with corrugated walls and a contact surface surrounding said cavity; means supporting the two series of half matrices movable along two endless paths having at least one substantially straight zone in which the half matrices in said two series are respectively arranged in pairs opposite to each other and for pressing in said straight zone the contact surfaces of each pair of half matrices against each other so that the cavities in each pair of half matrices form a single cavity having corrugated walls and the cavities of the half matrices in said straight zone form an elongated continuous mold cavity defining a corrugating zone; extrusion means extending into one end of said elongated continuous mold cavity for continuously extruding plastic material in tubular form directly into said elongated continuous mold cavity; drive means cooperating with said half matrices for moving the same along said endless paths during continuous extrusion of plastic material in tubular form into said elongated continuous mold cavity and in the direction in which the material is extruded; means for introducing a pressure fluid into the interior of a portion of the thus extruded tube and of a pressure sufficient to expand the tube into complete engagement with the corrugated walls of the half matrices; blocking means in the interior of a tube portion located in said elongated continuous mold cavity spaced from said extrusion means for substantially preventing any outflow of pressure fluid from the interior of the tube; and means cooperating with said blocking means for holding the latter in the interior of the tube a fixed distance from said extrusion means.

2. In an apparatus for continuously molding of corrugated tubes from hardenable plastic material, in combination, two series of equal numbers of half matrices arranged end-to-end in each series, each half matrix having a mold cavity with corrugated walls and a contact surface surrounding said cavity; means supporting the two series of half matrices movable along two endless paths having at least one substantially straight zone in which the half matrices in said two series are respectively arranged in pairs opposite to each other and for pressing in said straight zone the contact surfaces of each pair of half matrices against each other so that the cavities in each pair of half matrices form a single cavity having corrugated walls and the cavities of the half matrices in said straight zone form an elongated continuous mold cavity defining a corrugating zone; extrusion means extending into one end of said elongated continuous mold cavity for continuously extruding plastic material in tubular form directly into said elongated continuous mold cavity; drive means cooperating with said half matrices for moving the same along said endless paths during continuous extrusion of plastic material in tubular form into said elongated continuous mold cavity and in the direction in which the material is extruded; means for introducing a pressure fluid into the interior of a portion of the thus extruded tube and of a pressure sufficient to expand the tube into complete engagement with the corrugated walls of the half matrices; blocking means in the interior of a tube portion located in said elongated continuous mold cavity spaced from said extrusion means for substantially preventing any outflow of pressure fluid from the interior of the tube; and connecting means in the interior of the tube for connecting said extrusion means to said blocking means for holding the latter in said elongated continuous mold cavity a fixed distance from said extrusion means.

3. In an apparatus for continuously molding of corrugated tubes from hardenable plastic material, in combination, two series of equal numbers of half matrices arranged end-to-end in each series, each half matrix having a mold cavity with corrugated walls and a contact surface surrounding said cavity; means supporting the two series of half matrices movable along two endless paths having at least one substantially straight zone in which the half matrices in said two series are respectively arranged in pairs opposite to each other and for pressing in said straight zone the contact surfaces of each pair of half matrices against each other so that the cavities of the half matrices in said straight zone form an elongated continuous mold cavity defining a corrugating zone; extrusion means extending into one end of said elongated continuous mold cavity for continuously extruding plastic material in tubular form directly into said elongated continuous mold cavity; drive means cooperating with said half matrices for moving the same along said endless paths during continuous extrusion of plastic material into said elongated continuous mold cavity and in the direction in which the material is extruded; means for introducing a pressure fluid into the interior of a portion of the thus extruded tube and of a pressure sufficient to expand the tube into complete engagement with the corrugated walls of the half matrices; speed regulating means cooperating with said drive means for changing the speed at which said half matrices are advanced through said straight zone independently of the speed with which the tube is extruded so as to subject the tube to a stretching action by increasing the speed at which said half matrices are advanced; blocking means in the interior of a tube portion located in said elongated continuous mold cavity spaced from said extrusion means for substantially preventing any outflow of pressure fluid from the interior of the tube; and connecting means in the interior of the tube for connecting said extrusion means to said blocking means for holding the latter a fixed distance from said extrusion means.

4. In an apparatus for continuously molding of corrugated tubes from hardenable plastic material, in combination, two series of equal numbers of half matrices arranged end-to-end in each series, each half matrix having a mold cavity with corrugated walls of selected minimum diameter and a contact surface surrounding said cavity; means supporting the two series of half matrices movable along two endless paths having at least one substantially straight zone in which the half matrices in said two series are respectively arranged in pairs opposite to each other and for pressing in said straight zone the contact surfaces of each pair of half matrices against each other so that the cavities of the half matrices in said straight zone form an elongated continuous mold cavity defining a corrugating zone; extrusion means having an elongated extrusion nozzle means extending with a free end thereof into one end of said elongated continuous mold cavity for continuously extruding plastic material in form of a tube having an outer diameter considerably smaller than that of said selected minimum diameter directly into said elongated continuous mold cavity; drive means cooperating with said half matrices for moving the same along said endless paths during continuous extrusion of plastic material into said elongated continuous mold cavity in the direction in which the material is extruded; means for introducing a pressure fluid into the interior of a portion of the tube and of a pressure sufficient to expand the tube into complete engagement with the corrugated walls whereby all portions of the extruded tube are stretched in radial direction; blocking means in the interior of a tube portion located in said elongated continuous mold cavity spaced from said extrusion means for substantially preventing any outflow of pressure fluid from the interior of the tube; and connecting means in the interior of the tube for connecting said extrusion means to said blocking means for holding the latter a fixed distance from said extrusion means.

5. In an apparatus for continuously molding of corrugated tubes from hardenable plastic material, in combination, two series of equal numbers of half matrices arranged end-to-end in each series, each half matrix having a mold cavity with corrugated walls and a contact surface surrounding said cavity; cooling means cooperating with said half matrices in said straight zone for cooling the same; means supporting the two series of half matrices movable along two endless paths having at least one substantially straight zone in which the half matrices in said two series are respectively arranged in pairs opposite to each other and for pressing in said straight zone the contact surfaces of each pair of half matrices against each other so that the cavities in each pair of half matrices form a single cavity having corrugated walls and the cavities of the half matrices in said straight zone form an elongated continuous mold cavity defining a corrugating zone; extrusion means extending into one end of said elongated continuous mold cavity for continuously extruding plastic material in tubular form directly into said elongated continuous mold cavity; drive means co-operating with said half matrices for moving the same along said endless paths during continuous extrusion of plastic material in tubular form into said elongated continuous mold cavity and in the direction in which the material is extruded; means for introducing a pressure fluid into the interior of a portion of the thus extruded tube and of a pressure sufficient to expand the tube into complete engagement with the corrugated walls of the half matrices; blocking means in the interior of a tube portion located in said elongated continuous mold cavity spaced from said extrusion means for substantially preventing any outflow of pressure fluid from the interior of the tube; and connecting means in the interior of the tube for connecting said extrusion means to said blocking means for holding the latter in said elongated continuous mold cavity a fixed distance from said extrusion means.

6. In an apparatus for continuously molding of corrugated tubes from hardenable plastic material, in combination, two series of equal numbers of half matrices arranged end-to-end in each series, each half matrix having a mold cavity with corrugated walls of selected minimum diameter and a contact surface surrounding said cavity; means supporting the two series of half matrices movable along two endless paths having at least one substantially straight zone in which the half matrices in said two series are respectively arranged in pairs opposite to each other and for pressing in said straight zone the contact surfaces of each pair of half matrices against each other so that the cavities in said straight zone form an elongated continuous mold cavity defining a corrugating zone; extrusion means having an elongated extrusion nozzle of a bore diameter considerably smaller than said selected minimum diameter and an elongated mandrel arranged coaxially in the bore of said extrusion nozzle spaced from the inner surface thereof to define therewith an elongated annular space, said extrusion nozzle extending with a free end thereof into one end of said elongated continuous mold cavity for extruding plastic material in form of a tube through said annular space directly into said elongated continuous mold cavity, said elongated mandrel extending beyond said free end of said nozzle into said elongated continuous mold cavity; passage means formed in said mandrel and communicating with the interior of the extruded tube portion in said elongated mold cavity at a point short of the free end of said mandrel for feeding pressure fluid into the tube to expand the tube into complete engagement with the corrugated walls; a cylinder of a diameter substantially equal to the inner minimum diameter of the finished corrugated tube fixed to the free end of said mandrel; and drive means cooperating with said half matrices for moving the same along said endless paths during continuous extrusion of plastic material and in the direction in which the material is extruded.

7. In an apparatus for continuously molding articles from hardenable plastic material, in combination, rigid substantially uninterrupted stationary guide means defining two endless paths each having a straight zone parallel and communicating with the straight zone of the other path to form in said straight zone a guide track of a given width; a plurality of independent half matrices mounted for travel in end-to-end relation in each of said endless paths, each of said half matrices having a width substantially equal to half of said given width of said guide track in said straight zone and each of said half matrices having a mold cavity and a contact surface surrounding said mold cavity, said half matrices being arranged in pairs in said straight zone with said contact surfaces held in abutting relation by said guide track so that the mold cavities in each pair of half matrices form a single mold cavity and the single mold cavities formed by said pairs of half matrices in said straight zone an elongated continuous mold cavity; extrusion means located in the region of one end of said straight zone and extending into one end of said elongated continuous mold cavity for continuously extruding plastic material in tubular form in one direction thereinto; drive means engaging a pair of half matrices located at any instant in the region of said one end of said straight zone for pushing said pair of half matrices in said one direction and for continuously moving thereby all of said half matrices through said straight zone and along said endless paths; means for introducing a pressure fluid into the interior of the extruded tube for expanding the latter into engagement with said contact surface of the respective half matrices; and blocking means connected to said extrusion means and positioned in the interior of said tube spaced from said extrusion means for substantially preventing outflow of pressure fluid from said tube.

8. An apparatus as set forth in claim 7 in which each of said half matrices is formed at an outer surface thereof transverse to said contact surface with a toothed rack extending the whole length of said half matrix and in which said drive means includes gear means meshing with the toothed racks of a pair of half matrices located at any instant in the region of said one end of said straight zone.

9. In an apparatus for continuously molding articles from hardenable plastic material, in combination, rigid substantially uninterrupted stationary guide means defining two endless paths each having a straight zone parallel and communicating with the straight zone of the other path to form in said straight zone a guide track of a given width and each of said paths including at each end of said straight zone a curved zone; a plurality of independent half matrices mounted for travel in end-to-end relation in each of said endless paths, each of said half matrices having a width substantially equal to half of said given width of said guide track in said straight zone and each of said half matrices having a mold cavity and a contact surface surrounding said mold cavity, said half matrices being arranged in pairs in said straight zone with said contact surfaces held in abutting relation by said guide track so that the mold cavities in each pair of half matrices form a single mold cavity and the single mold cavities formed by said pairs of half matrices in said straight zone an elongated continuous mold cavity, each of said half matrices having at least at one side of said contact surface inclined surfaces extending from opposite ends of said half matrix toward each other and forming wedge-shaped spaces in said pairs of half matrices; extrusion means located in the region of one end of said straight zone and extending into one end of said elongated continuous mold cavity for continuously extruding plastic material in tubular form in one direction thereinto; drive means engaging a pair of half matrices located at any instant in the region of said one end of said straight zone for pushing said pair of half matrices in said one direction and for continuously moving thereby all of said half matrices through said straight zone and along said endless paths; means for introducing a pressure fluid into the interior of the extruded tube for expanding the latter into engagement with said contact surface of the respective half matrices; blocking means connected to said extrusion means and positioned in the interior of said tube spaced from said extrusion means for substantially preventing outflow of pressure fluid from said tube; and stationary wedge means arranged at opposite ends of said straight zone and cooperating with said wedge-shaped spaces for facilitating transition of said half matrices from said curved into said straight zone and vice versa.

10. In an apparatus for continuously molding articles from hardenable plastic material, in combination, rigid substantially uninterrupted stationary guide means defining two endless paths each having a straight zone parallel and communicating with the straight zone of the other path to form in said straight zone a guide track of a given width, said guide means including a pair of hollow elongated wall members forming a closed cavity; means communicating with said closed cavity for circulating a cooling fluid therethrough; a plurality of independent half matrices mounted for travel in end-to-end relation in each of said endless paths, each of said half matrices having a width substantially equal to half of said given width of said guide track in said straight zone and each of said half matrices having a mold cavity and a contact surface surrounding said mold cavity, said half matrices being arranged in pairs in said straight zone with said contact surfaces held in abutting relation by said guide track so that the mold cavities in each pair of half matrices form a single mold cavity and the single mold cavities formed by said pairs of half matrices form in said straight zone an elongated continuous mold cavity; extrusion means located in the region of one end of said straight zone and extending into one end of said elongated continuous mold cavity for continuously extruding plastic material in tubular form in one direction thereinto; drive means engaging a pair of half matrices located at any instant in the region of said one end of said straight zone for pushing said pair of half matrices in said one direction and for continuously moving thereby all of said half matrices through said straight zone and along said endless paths; means for introducing a pressure fluid into the interior of the extruded tube for expanding the latter into engagement with said contact surface of the respective half matrices; and blocking means connected to said extrusion means and positioned in the interior of said tube spaced from said extrusion means for substantially preventing outflow of pressure fluid from said tube.

References Cited by the Examiner

UNITED STATES PATENTS

| | | | |
|---|---|---|---|
| 1,603,140 | 10/1926 | Muller | 18—5 |
| 2,288,611 | 7/1942 | De Wyk | 18—6 |
| 2,491,589 | 12/1949 | Slaughter | 18—14 |
| 2,602,960 | 7/1952 | Fischbien | 18—6 X |
| 2,690,591 | 10/1954 | Wallace | 18—6 |
| 2,708,772 | 5/1955 | Moncrieff | 18—14 X |
| 2,728,942 | 1/1956 | Wallace | 18—6 |
| 2,760,228 | 8/1956 | Verges | 18—14 |
| 2,866,230 | 12/1958 | Holte | 18—19 |
| 2,897,840 | 8/1959 | Roberts et al. | |
| 2,903,743 | 9/1959 | Lysobey | 18—19 |
| 2,936,491 | 5/1960 | Hamlin | 18—56 |
| 2,954,581 | 10/1960 | Colombo | 18—5 |
| 3,015,857 | 1/1962 | Weinandy | 18—56 |
| 3,035,302 | 5/1962 | Lysobey | 18—5 |
| 3,065,500 | 11/1962 | Berner | 18—4 |

WILLIAM J. STEPHENSON, *Primary Examiner.*

MORRIS LEIBMAN, *Examiner.*